April 29, 1958     E. C. LANGE     2,832,558

SUN VISOR

Filed March 29, 1955

INVENTOR
Edmund C. Lange
BY Gustave Miller
ATTORNEY

# United States Patent Office 2,832,558
Patented Apr. 29, 1958

2,832,558
SUN VISOR
Edmund C. Lange, Pittsburgh, Pa.

Application March 29, 1955, Serial No. 497,555

1 Claim. (Cl. 248—278)

This invention relates to sun visors for use in automobiles and the like, and particularly relates to sun visors of the adjustable type.

There have, heretofore, been many different types of sun visors on the market. These visors are usually pivotally connected to a bracket at the top of the car above the windshield, and adapted to be pivoted down into operative position against the upper portion of the car windshield or up into inoperative position against the car roof. The sun visor may generally also be pivoted on a vertical axis to bring it into position against the side window. However, in order to give this visor sufficient stability in its various adjusted positions, the pivotal connection must be made so tight that it is difficult to adjust the device. Furthermore, this tight connection usually tends to loosen with time and use, and when it does, the visor cannot be kept in adjusted position but, instead, tends to flop around. In addition, such sun visors are generally opaque and, therefore, tend to cut off some of the field of vision of the driver.

It is one object of the present invention to provide a sun visor for automobiles and the like, which is easy to adjust, and which is yet rigidly fixed in its adjusted position.

Another object of the present invention is to provide a sun visor for automobiles and the like which is fully effective for its purpose without cutting off any part of the field of vision of the driver.

Other objects of the present invention are to provide a sun visor, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
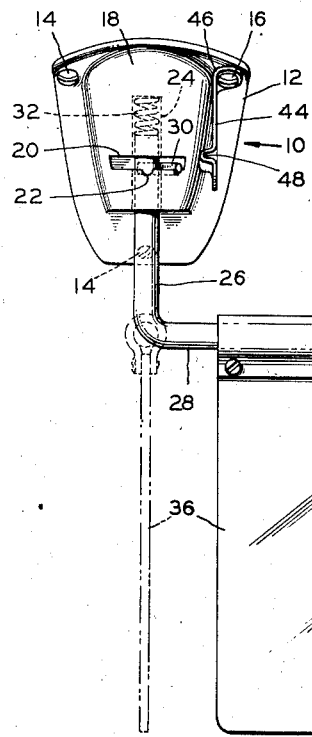
Fig. 1 is a front elevational view of a sun visor embodying the present invention, the sun visor being shown in lowered position.

Referring now in greater detail to the drawing wherein similar reference characters refer to similar parts, there is shown a bracket, generally designated 10, which consists of a face plate 12 having a plurality of openings 14 therein for accommodating screws 16 for the purpose of connecting the plate to an overhead part of the car interior.

Figure 2:
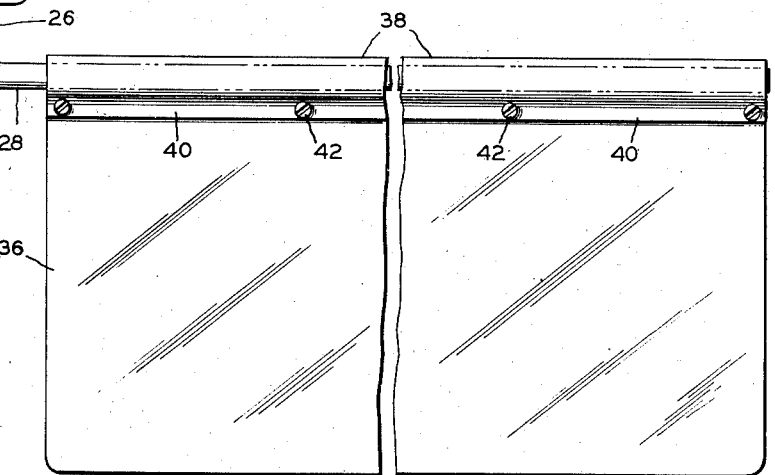
Fig. 2 is a side elevational view of the device of Fig. 1, alternate positions being shown in dotted outline.
Figure 2:
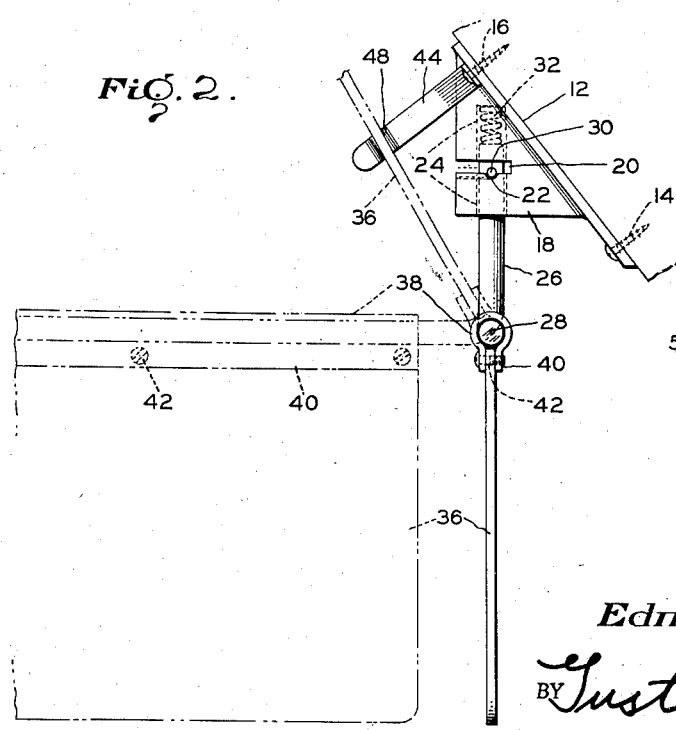

Extending forwardly from the front surface of the plate 12 is a housing 18, which is generally triangular when viewed in side elevation as in Fig. 2. When viewed in front elevation, as in Fig. 1, the housing is seen to be generally curved. A horizontal slot 20 is provided on the front face of the housing 18 and is arcuate in shape to conform to the generally curved contour of the housing. A pair of 90 degree offset notches, shown at 22, are provided in the slot 20. A vertical bore 24 extends partially through the housing 18 from the bottom thereof and, in this bore, is positioned the upper end of the vertical portion 26 of a bent rod 28. The bore 24, it should be noted, intersects the slot 20. A pin 30 extends laterally from the portion 26 of rod 28, and this pin is adapted to engage within one or the other of the notches 22 depending on the rotational adjustment of the rod portion 26 in the bore 24. A coil spring 32 is loosely positioned in the top of the bore 24 and acts to bias the rod portion 26 downwardly while the pin 30 is positioned in the slot 20 at all times and thereby prevents the rod from falling out of the bore. In this manner, the spring acts to resiliently retain the pin within the slot and to urge the pin into one of the notches when it is moved into a corresponding position. On the horizontal portion of rod 28 is provided a sun visor shield in the form of a sheet 36 which is constructed of a colored or tinted transparent material such as the so-called "safety glass" or a transparent plastic material such as "Plexiglas." The tint or coloration may be provided during or after manufacture of the sheet, depending on the nature of the material and the process of manufacture. In any case, the tint or coloration is of the type which retains the substantial transparency of the material while filtering out the glare-producing portion of the sun's rays.

The sheet 36 is connected to the rod 28 by a sleeve 38 which encompasses the horizontal portion of the rod 28, except for the bottom thereof. At the bottom, the sleeve is provided with a pair of depending flanges 40 which act to clamp the upper margin of the sheet 36 therebetween. The clamping action is produced by means of screws, bolts or the like, such as indicated at 42, these screws or bolts extending through the flanges 40 and through the marginal portion of the sheet 36. If desired, a bonding or cementing material may be substituted for the screws or bolts.

Figure 3:
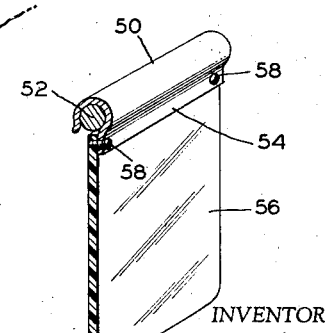
Fig. 3 is a fragmentary view, partly in perspective and partly in section, showing a second embodiment of the invention.

The relationship between the sleeve 38 and rod 28 is such that the sleeve is rotatable relative to the rod to move the visor 36, in a pivotal manner, from a downward, operative position, such as shown in full line in Figs. 1 and 2, to an upward, inoperative position, such as shown in dotted outline in Fig. 2. When raised to its upper, inoperative position, the visor 36 is maintained in such position automatically by a spring arm 44 connected to the plate 12 by one of the screws 16, which extends through a corresponding opening in a flange 46 on one end of spring arm 44. The spring arm 44 is further provided with a notch 48. It is in this notch 48 that one of the side margins of the visor automatically engages when raised to its upper position. The resilient nature of the notch 48 automatically clamps the visor 36 in its raised position when engagement therewith takes place. The visor 36 is also capable of being pivoted into an operative position perpendicular to that shown in full line, as indicated in dotted outline in Figs. 1 and 2. In this position, which is reached by rotating the rod portion 26 in bore 24, the visor acts to shield the eyes of the driver from sun rays entering through the side window of the car instead of through the windshield. In Fig. 3 there is shown a modified form of the invention wherein the parts are generally similar to those of the embodiment described above except that, instead of the sleeve 38, there is provided a sleeve 50 which is constructed of a resilient material such as spring steel or the like. The resilient nature of the sleeve 50 effects a clamping action between the rod 52 and the sleeve 50, although the sleeve is still capable of rotating relative to the rod. A downwardly depending flange 54 is provided on the sleeve 50 and the visor 56, of tinted safety glass or transparent plastic, is connected to the flange as by screws, bolts or the like, indicated at 58. As in the first embodiment, a bonding or cementing material may be substituted for the screws or bolts.

From the above, it can be seen that a substantially universally adjustable sun visor is provided wherein the various adjustments can easily be made because of the free play between the various parts which prevents frictional binding; at the same time, means are provided for positively retaining the parts in their adjusted positions so that slippage therebetween is prevented.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A sun visor for a vehicle comprising a plate arranged to be connected to a part of the vehicle, a housing depending from said plate, a bore extending upwardly into said housing, a coil spring within the upper end of said bore, a slot extending horizontally into said housing and intersecting said bore, a pair of spaced apart notches in the lower edge of said slot, an L-shaped rod having its short leg extending upwardly into said bore against said coil spring therewithin, a pin secured in said short leg and extending through said slot and bearing against the lower edge thereof to maintain said short leg in said bore, said coil spring urging said rod leg downwardly to resiliently urge said pin against said lower edge of said slot, said pin being arranged to engage within one of said spaced apart notches upon a predetermined rotational movement of said rod, a glare shield rotatably mounted on the leg of said L-shaped rod, a leaf spring secured at one end to said plate adjacent said housing, and a latching notch at the other end of said leaf spring to releasably engage said glare shield when said glare shield is rotated to a predetermined position relative to said rod, and to release said glare shield upon manual actuation of said leaf spring.

References Cited in the file of this patent

UNITED STATES PATENTS

| | | |
|---|---|---|
| 66,458 | Brown | July 9, 1867 |
| 1,573,272 | Phillips | Feb. 16, 1926 |
| 1,697,502 | Groenenstein | Jan. 1, 1929 |
| 1,790,333 | Tubman | Jan. 27, 1931 |
| 1,995,772 | Jacobs | Mar. 26, 1935 |
| 2,112,464 | Jacobs | Mar. 29, 1938 |
| 2,160,505 | Jacobs | May 30, 1939 |
| 2,207,668 | Hudgings, Jr. | July 9, 1940 |
| 2,628,125 | Jacobs | Feb. 10, 1953 |

FOREIGN PATENTS

| | | |
|---|---|---|
| 612,972 | France | Nov. 5, 1926 |